United States Patent [19]

Shaw et al.

[11] Patent Number: 5,924,461

[45] Date of Patent: Jul. 20, 1999

[54] LIQUID CONTAINMENT APPARATUS WITH FLEXIBLE SIDE WALL

[75] Inventors: Mark D. Shaw, Ponte Vedra Beach; J. Tad Heyman; Laurence M. Bierce, both of Jacksonville, all of Fla.

[73] Assignee: UltraTech International, Inc., Jacksonville, Fla.

[21] Appl. No.: 08/883,819

[22] Filed: Jun. 27, 1997

[51] Int. Cl.⁶ .................................................... F16N 31/00
[52] U.S. Cl. ............................ 141/86; 141/98; 220/9.1; 220/573; 184/106
[58] Field of Search ...................... 141/86, 87, 98; 184/1.5, 106; 137/312–314; 220/9.1–9.3, 571, 571.1, 573

[56] References Cited

U.S. PATENT DOCUMENTS

| | | | |
|---|---|---|---|
| 92,364 | 7/1869 | Rider | 4/587 |
| 3,306,329 | 2/1967 | Braun | 220/9.2 |
| 5,090,588 | 2/1992 | Van Romer et al. | 220/573 |
| 5,316,175 | 5/1994 | Van Romer | 220/573 |
| 5,547,312 | 8/1996 | Scmitz, Jr. | 220/573 |
| 5,762,233 | 6/1998 | Van Romer | 220/573 |

Primary Examiner—J. Casimer Jacyna
Attorney, Agent, or Firm—Thomas C. Saitta

[57] ABSTRACT

A liquid containment apparatus which has an automatically resilient, collapsible wall whereby vehicles can drive into and out of the apparatus. The side walls are supported by brace members having a generally vertically oriented upper member joined by a resistance-type hinge to a base member, such that the upper member can be flexed in either an outward or inward direction. The upper members preferably support the side walls such that they lean inwardly, and preferably the brace members are removable.

14 Claims, 5 Drawing Sheets

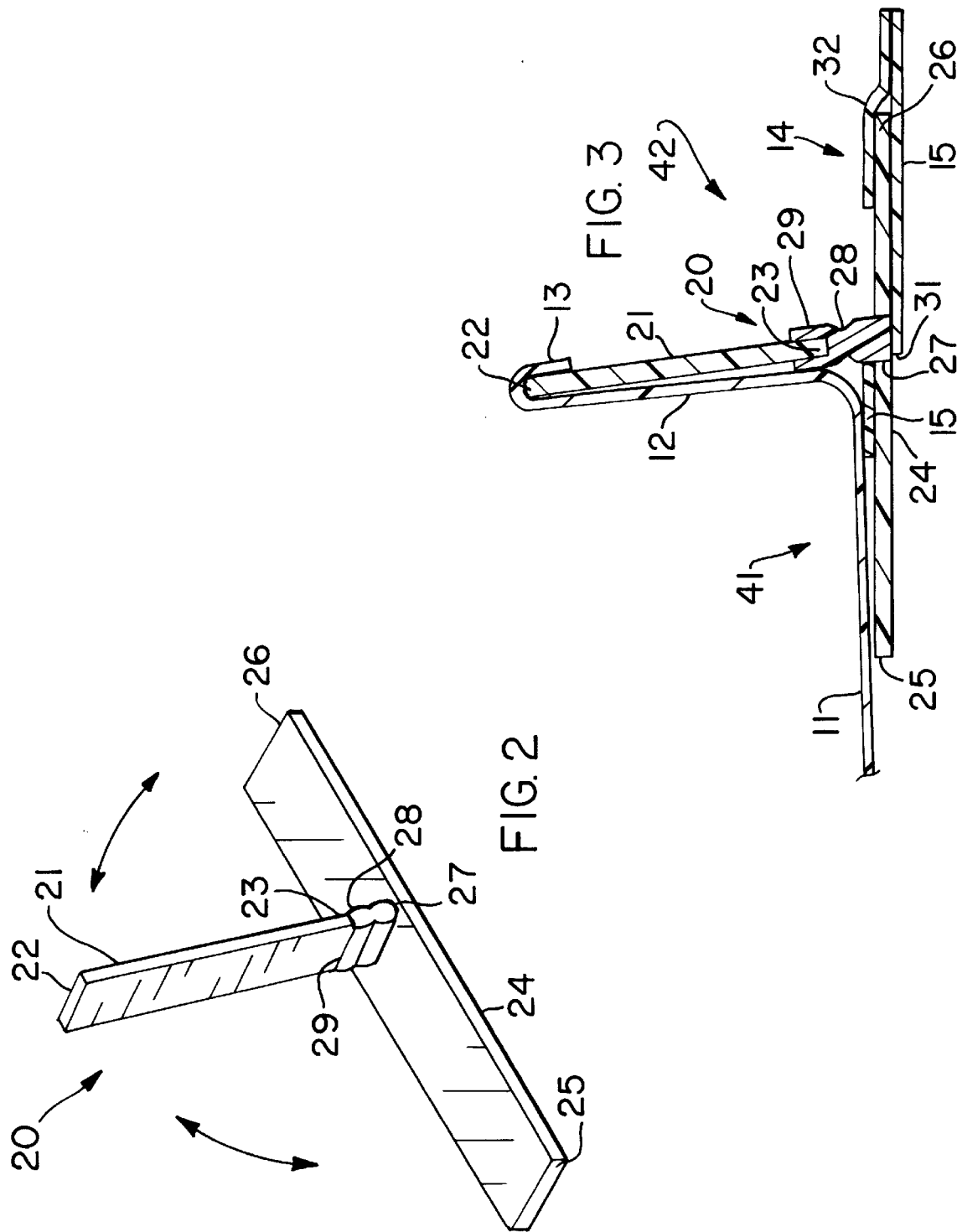

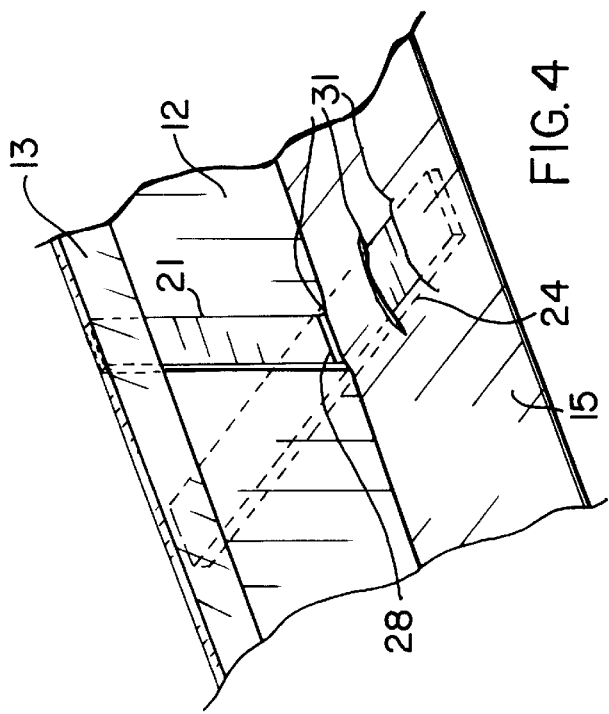
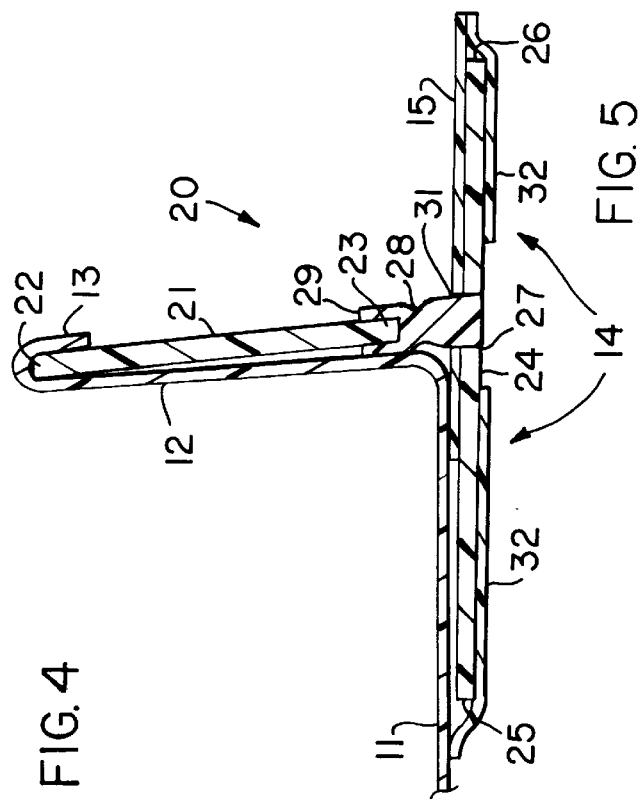

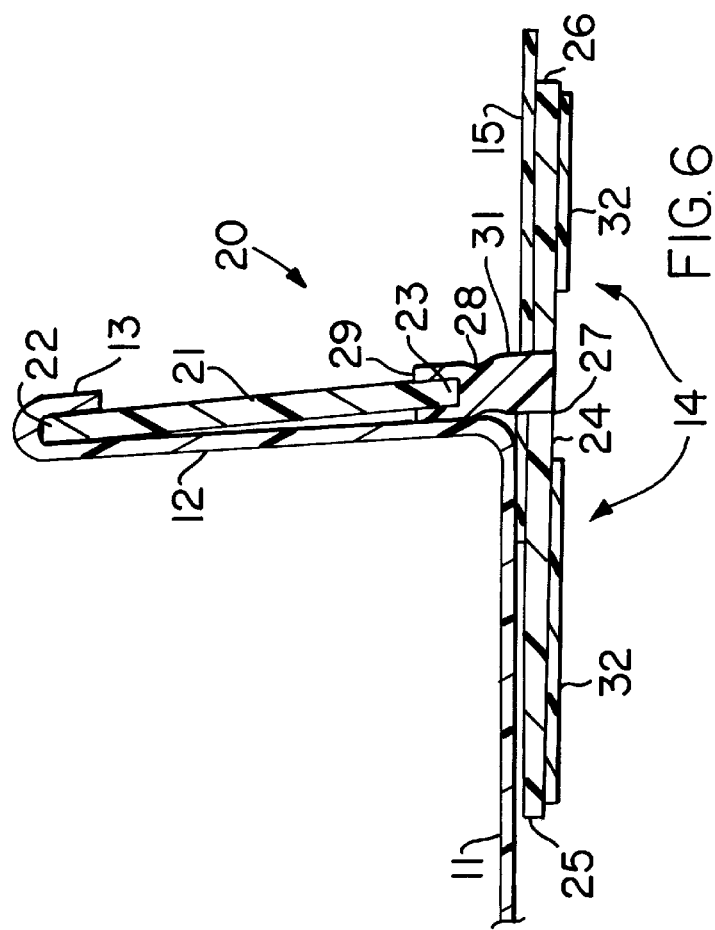
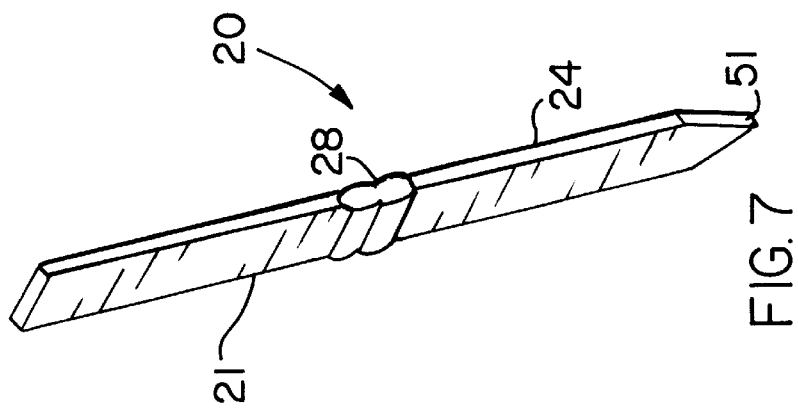

5,924,461

LIQUID CONTAINMENT APPARATUS WITH FLEXIBLE SIDE WALL

BACKGROUND OF THE INVENTION

This invention relates generally to the field of devices used to contain liquids, and especially such devices used as secondary containment to capture spills or run-offs of hazardous or non-environmentally-friendly liquids. More particularly, the invention relates to such devices which comprise a unified bottom and side walls to define a relatively large volume reservoir. Even more particularly, the invention relates to such devices which provide means to enable a wheeled vehicle to be driven into and out of the device, where at least a portion of the wall is collapsible as a wheel crosses and which rebounds once the wheel has passed.

There are numerous circumstances where it is desirable or required by law to contain certain hazardous liquids to prevent the liquids from entering the environment. For example, any spillage of liquids such as gasoline, oil, detergents, chemicals or the like during loading and unloading operations between liquid transport vehicles and storage tanks, during vehicle clean-up operations, or during vehicle fueling, must be captured and properly disposed of. Most locations where these events occur have no permanent recapture structures or systems, so it is necessary to provide a walled containment apparatus which is sufficient in size to allow a vehicle, such as a large tanker truck, to be positioned within its walls. Means to allow the vehicle to enter and exit the containment apparatus must also be provided. In general, apparati of this nature comprise pool-like structures, and typically are either fully rigid, have flexible walls of sheet material and gate means, have flexible walls and compressible wall support means, or have flexible walls and deformable or collapsible wall support means.

For example, U.S. Pat. No. 5,478,625 to Wright, shows a rigid containment device. Double-sided ramps at each end of the device enable a vehicle to be driven into and out of the device. U.S. Pat. No. 5,547,312 to Schmitz, Jr., shows a pool-like apparatus having a floor and side walls made of a flexible sheet material. The walls are supported by a rigid frame having a peripheral upper member and a gate is provided at one end which can be lowered and raised to provide entry and exit means for the vehicle. U.S. Pat. No. 5,464,492 to Gregory et al. shows a containment device with walls supported by a foam member which is compressed by the vehicle wheel and which rebounds to create the wall when the vehicle wheel has passed. U.S. Pat. No. 5,090,588 to Van Romer et al. shows a device made of a flexible sheet material, where the wall is supported by a combination of vertical members adjacent the wall, a peripheral upper member, and internal brace members mounted to the floor of the device. The vertical support members and wall flex when a wheel passes over, and the internal brace members pull the wall back into the upright position after the wheel has passed.

It is an object of this invention to provide an improved liquid containment apparatus for capturing liquid spills, especially such apparatus where a wheeled vehicle can be driven into and out of the containment apparatus. It is a further object to provide such an apparatus which is composed of flexible, liquid-impermeable, sheet material joined to create a floor and side wall, where said side wall is supported by a number of spaced, collapsible, support members with no need for a peripheral upper member, such that the apparatus is readily collapsible for transport or storage. It is a further object to provide such an apparatus where the wall support members have a relatively rigid upper member hingedly attached to a base member horizontally disposed beneath the floor whereby the upper member can flex either inwardly or outwardly, and where the upper member is slanted inward relative to the interior of the device when in the passive position, preferably at an angle of about 10 degrees from vertical, and further where the hinge member is sufficiently stiff to prevent outward flexation except when a vehicle wheel crosses the side wall. These and other objects are accomplished as set forth below.

SUMMARY OF THE INVENTION

The invention comprises in general a liquid containment apparatus, configured as a pool or a floored berm, having a floor or bottom joined to a generally upstanding side wall or walls to define a capture area or reservoir to retain liquid. The side walls of the apparatus are preferably relatively short in relation to the floor dimensions, and the walls and floor are formed of a flexible, liquid impermeable material having good durability and chemical resistance characteristics. The general configuration may be square, rectangular, circular, oval or any other desired shape. In particular, the apparatus is constructed such that a wheeled vehicle can be driven into and out of the apparatus, with portions of the side wall being deformed or collapsed by the wheels and which rebound into the upright passive position after the wheels have passed.

The side wall or walls are supported by a number of independent support brace members comprising a relatively rigid upper member joined to a relatively rigid, horizontally disposed base member by a hinge member. The upper member supports the side wall on the exterior side, the upper end fitting into a pocket or similar retention means located along the upper edge of the side wall. An interior portion of the base member extends beneath the floor member through an aperture in a skirt member attached to the exterior periphery of the floor member, with the outer portion of the base member secured to the skirt member within a slot or pocket. A pocket or slot may also be provided on the underside of the floor member to receive the interior portion of the base member. The hinge member is constructed such that the upper member can flex both outward and inward relative to the apparatus, thus allowing the side wall to flex either outward or inward as necessary. The hinge is preferably composed of a relatively stiff elastomeric material having a sleeve-like open end to receive the bottom end of the upper member, where the hinge member is sufficiently stiff such that the upper member and side wall are maintained in the upright position unless the inherent resistance of the hinge member is overcome by sufficient force, where the force or weight of liquid within the apparatus is not sufficient to cause the upper member and side wall to flex outward but the force of a vehicle wheel is sufficient.

It is preferred that the upper member slant inward toward the interior of the apparatus in the passive position, most preferably at an angle of about 10 degrees from vertical, such that the side walls slant inward toward the interior to better retain large amounts of liquid.

The apparatus is collapsible into a smaller configuration for storage or transport, and the wall support brace members may be removable. The apparatus may have all side walls constructed in the same manner as set forth above, or the apparatus may be constructed such that only one or opposing side walls are collapsible, with the remaining side walls constructed in a more rigid manner. The apparatus may operate as a stand-alone device, or the apparatus may be used in conjunction with an existing physical structure, such as for example the interior of a truck trailer, in which case one side wall is collapsible and is positioned at the open end of the trailer, with the other side walls attached or supported by the trailer walls.

BRIEF DESCRIPTION OF THE DRAWINGS

FIG. 2 is a perspective view of a support brace member.

FIG. 3 is a cross-sectional view taken along line III—III of FIG. 1, showing the support brace member positioned within the upper member and base member retention means.

FIG. 4 is a perspective view showing an alternative base member retention means.

FIG. 5 is a cross-sectional view similar to FIG. 3, showing an alternative base retention means.

FIG. 6 is a cross-sectional view similar to FIG. 5, showing an alternative base retention means.

FIG. 7 is a perspective view of an alternative brace member.

DETAILED DESCRIPTION OF THE INVENTION

With reference to the drawings, the invention will now be described in detail with regard to the best mode and the preferred embodiment. In the most general sense, the invention is a liquid containment apparatus formed by the combination of a floor member and side walls made of flexible material which enables the apparatus to be folded for transport or storage, where the side walls are maintained in a generally upright but inwardly inclined position by a number of individual brace members. In the preferred embodiment, the invention is designed for use with wheeled vehicles such that a vehicle can be driven into and out of the apparatus, with at least one of the side walls and associated brace members being capable of collapsing or folding to permit the vehicle wheels to roll across the side wall and then rebounding to an upright passive position after the wheels have passed, such that an interior capture reservoir is created around the vehicle to retain any liquids.

Figure 1:
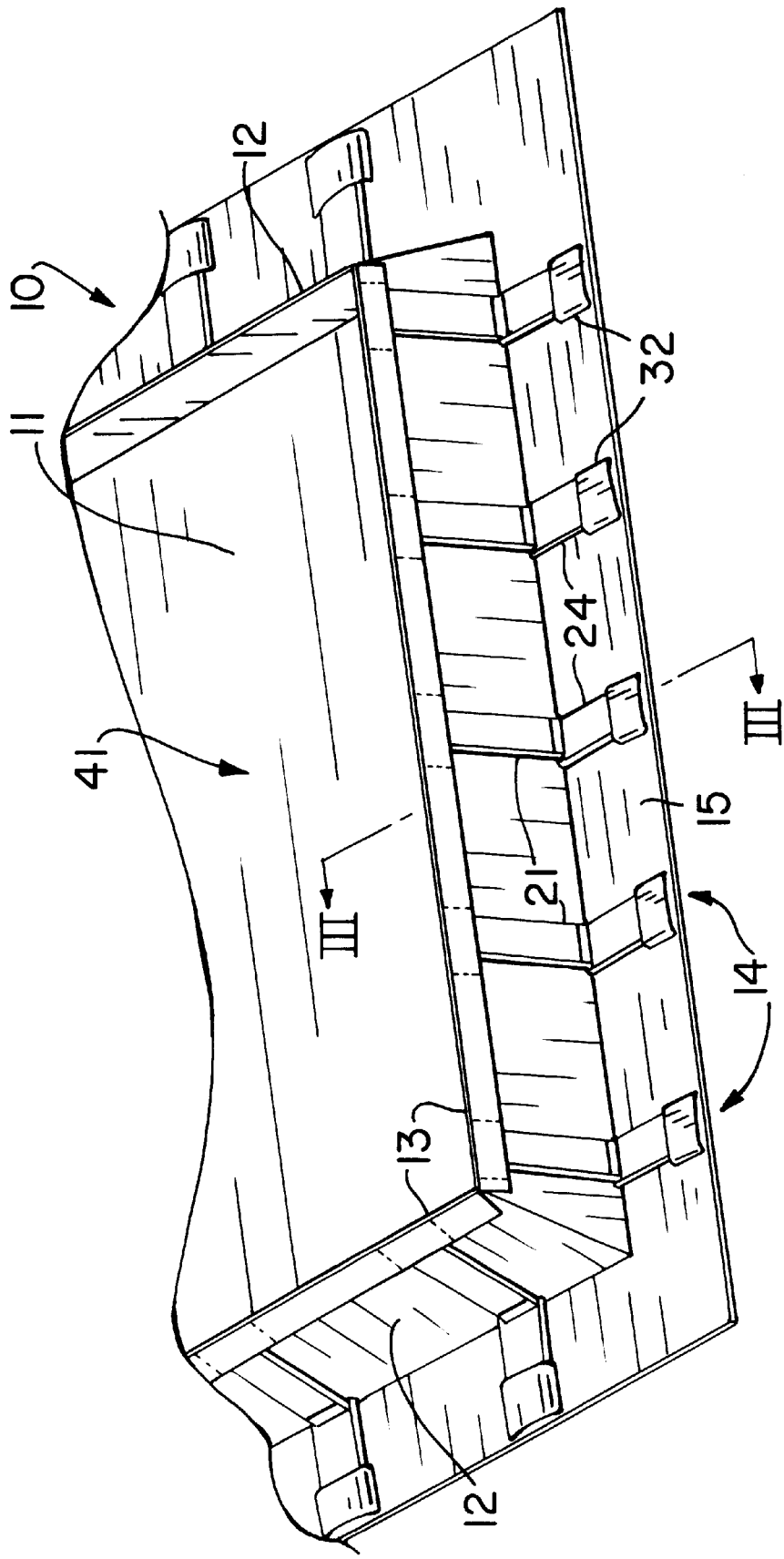
FIG. 1 is a partial perspective view of the invention.
Figure 8:
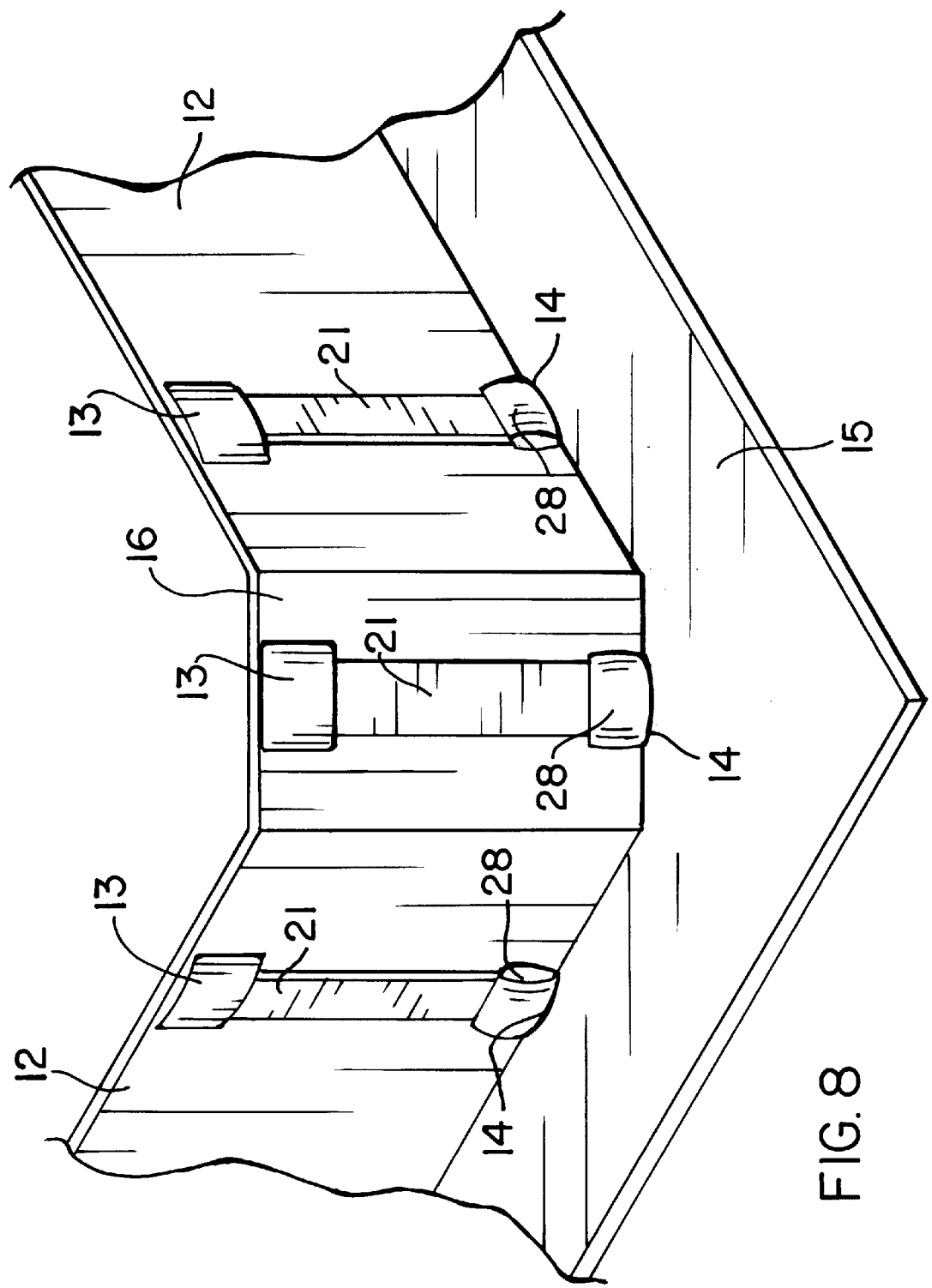
FIG. 8 is a partial perspective view of the invention with chamfered corners.

As seen in FIG. 1, the invention is a liquid containment apparatus 10 which comprises in general a floor or bottom member 11 and side wall or walls 12 which in combination define an interior reservoir area 41 capable of receiving and retaining a large amount of liquid. The floor member 11 and side walls 12 are composed of a liquid impermeable, flexible, thin, sheet material which is preferably highly durable and chemical resistant, and will typically consist of a polymeric material. Preferably the side walls 12 are upturned portions of the material forming the floor member 11 so that no seam or juncture is required between the two elements, but the floor 11 and side walls 12 may be joined by adhesive, stitching, heat-sealing or any other suitable known manner of fastening to create an impermeable combination. The dimensions of the containment apparatus 10 may vary greatly, but the height of side walls 12 is typically relatively short in relation to the overall dimensions of floor member 11, usually having a height of approximately one foot or less. As shown in FIG. 1, the containment apparatus 10 has a square or rectangular configuration, but other shapes such as circular, oval or the like are also possible. Preferably the corners of the side walls 12 are rounded or chamfered, as shown in FIG. 8. The chamfered wall section 16 provides cross-bracing against the outward force of any liquid captured within the apparatus 10 and thus assists in maintaining the side walls 12 in an upright position. A peripheral floor skirt or ground member 15, preferably made of the same or similar material to the floor 11 or side wall 12 but not necessarily liquid impermeable, is attached to either the underside of the floor member 11 or the exterior bottom of the side walls 12 by suitable means, preferably by heat-sealing or with an adhesive so that the floor II or side wall 12 does not need to be breached.

The side wall or walls 12 are maintained in a generally upright position by a number of independent and individual wall support brace members 20 which are positioned on the exterior side 42 of the containment apparatus 10. As shown in FIG. 2, brace members 20 comprise a generally upstanding upper member 21 having an upper end 22 and a lower end 23, a generally horizontally disposed base member 24 having an interior end 25 and an exterior end 26, and a hinge member 28 joining the upper member 21 to the base member 24, preferably by insertion of the hinge member 28 into a hinge receiving slot 27 positioned in base member 24 farther from the interior end 25 than from the exterior end 26. The brace members 20 are positioned at spaced apart locations around the side walls 12, with the interior end 25 of base member 24 extending through a slot 31 in the skirt member 15 at the base of the side walls 12 so as to be beneath the floor member 11, and the brace members 20 are further secured in proper position by upper member retention means 13 and base member retention means 14. The hinge members 28 are positioned to be external to the side walls 12 and adjacent the junction between the side walls 12 and the floor member 11. Alternatively, as shown in FIG. 7, for circumstances where the ground is not paved, the brace members 20 can be a generally linear member having an upper member 21, a hinge member 28 and a generally vertically disposed base member 24, preferably ending in a point 51, of suitable strength and rigidity for the base member 24 to be manually inserted into the ground at an inwardly leaning angle so that the upper member 21 supports the side walls 12 properly.

Upper members 21 are substantially rigid and may be composed of hard plastic, metal or similar material, preferably having a thin, elliptical cross-sectional configuration. Base members 24 are likewise substantially rigid and may also be composed of hard plastic, metal or the similar material. Base members 24 are preferably also rectangular in cross-section, but will typically be thicker than the upper members 21. Typical dimensions for the upper member 21 may be approximately 11 inches in length, approximately 1 inch in width and approximately ¼ inch in thickness. Typical dimensions for the base member 24 may be approximately 20 inches in length, approximately 2 and ¼ inches in width and approximately ½ inch in thickness. A hinge member receiving slot 27 is preferably positioned approximately 12 inches from the interior end 25 of base member 24 and approximately 8 inches from the exterior end 26 of base member 24.

Upper member retention means 13 retain the upper end 22 of upper member 21 of brace member 20, and as shown preferably comprises an upper portion of the side wall 12 folded and secured to the exterior side 42 of the containment apparatus 10 to form a peripheral flap or pocket. The upper member retention means 13 may be joined to the side wall 12 by heat-sealing, adhesive, mechanical fasteners, stitching or any other suitable method. Alternatively, upper member retention means 13 could comprise individual pockets formed by attaching small portions of material to the top of side walls 12, the pockets opening downward to receive the upper end 22 of the upper member 21. Base member retention means 14 are preferably formed in skirt member 15 and retain the base member 24 in a secured manner, and may comprise pocket members 32 attached to the outer portion of skirt member 15 which receive and retain the exterior end 26 of base member 24, as shown in FIGS. 1 and 3, or either closed or open pockets 32 attached to the underside of the floor member 11 as shown in FIGS. 5 and 6. Base member retention means 14 may alternatively comprise slots 31 cut into skirt member 15 which enable the exterior end 26 of base member 24 to be threaded therethrough, as shown in FIG. 4, or provide an insertion point for the linear brace members 20. The base member retention means 14 prevent movement of the brace members 20 relative to the floor member 11 and side walls 12, and also maintain proper alignment of the brace members 20 when the upper member 21 is flexed in either direction.

Preferably, the base retention means 14, the upper member retention means 13 and the brace members 20 are constructed such that the brace members 20 may be removed and later replaced if the containment apparatus 10 is to be stored or transported. Upper member 21 may be permanently or removably attached to the base member 24. In one embodiment, the brace member 20 is inserted by collapsing the upper member 21 in the outward direction to lie essentially parallel to the exterior end 26 of the base member 24, inserting the interior end 25 of the base member 24 and the hinge member 28 through the slot 31 at the base of the side wall 12 sufficient distance such that the exterior end 26 of the base member 20 is insertable into the pocket 32 or slots 31 forming the base member retention means 14 in the skirt member 15, inserting the exterior end 26 therein and sliding the hinge member 28 and base member 24 outward such that the hinge member 28 is positioned exterior to the side wall 12 and adjacent the junction between the side wall 12 and floor member 11, then inserting the upper end 22 of the upper member 21 into the upper member retention means 13. Alternatively, the brace member 20 can be formed such that the upper member 21 and/or the hinge member 28 are removable from the base member 24, in which case the base member 24 is inserted into the base member retention means 14 such that the hinge receiving slot 27 or hinge member 28 is positioned at the exterior base of the side wall 12, and the hinge member 28 is then inserted into the hinge receiving slot 27 or the upper member 21 is inserted into the upper member receiving sleeve 29 of the hinge member 28, with the upper end 22 inserted into the upper end retention means 13.

The hinge member 28 of the brace member 20 is a resistance-type hinge, such that in the passive state where no force or weight is applied by an outside object, the upper member 21 is maintained in a generally upright position relative to the base member 24. To flex or bend the hinge member 28 requires an amount of force in excess of a minimum bending threshold, and the hinge member 28 is preferably structured such that the maximum force possibly encountered from the weight of liquid within the interior reservoir 41 is beneath the minimum bending threshold and therefore is insufficient to flex the hinge member 28. In other words, even with the interior reservoir 41 of the containment apparatus 10 completely filled with liquid, the hinge member 28 and upper member 21 will not flex outward, thus insuring that all the liquid is retained within the containment apparatus 10 for subsequent drainage and disposal. When a vehicle is driven over the side wall 12, however, the weight or force is easily sufficient to fold the hinge member 28 and collapse the side wall 12. In a preferred embodiment, as shown in FIGS. 2 and 3, the hinge member 28 is formed of a relatively stiff polymeric or elastomeric material of greater thickness than the upper member 21 of brace member 20. The hinge member 28 has an upper member receiving sleeve or pocket 29 which receives and retains the lower end 23 of upper member 21. A portion of the hinge member 28 has a reduced thickness on the both major sides, which acts as a flexation line and allows the hinge to fold when sufficient force is applied. Because the hinge member 28 has a rectangular cross-section, the hinge member 28 will bend outward or inward only along a single directional line. In an alternative embodiment, shown in FIG. 4, the hinge member 28 is formed as a portion of the upper member 21 itself, such that the hinge member 28 comprises only a portion of reduced thickness on both major sides of the upper member 21 adjacent the lower end 23, which is directly attached to the base member 24.

In the most preferred embodiment, the upper member 21 of the brace member 20 is positioned at an attitude slightly off from true vertical in the passive state, and preferably at approximately 10 degrees off vertical, with the upper member 21 slanting inward toward the side wall 12 and the interior reservoir 41 of the containment apparatus 10, as shown in FIG. 3. In this manner the combination of brace members 20 and side walls 12 create an interior reservoir where the base perimeter dimensions are greater than the top perimeter dimensions. This configuration is preferred because it raises the force threshold required to flex the support brace members 20 outward, since liquid build-up must first overcome the inherent resistance of the hinge member 28 and bend the upper member 21 over 10 degrees and through true vertical before the downward moment of the weight of the liquid above the hinge member 28 increases the outward moment. If the side walls 12 and upper members 21 of the brace members 20 were positioned at true vertical in the passive state, the inherent resistance in the hinge member 28 would more easily be overcome.

The containment apparatus 10 may be formed with all side walls 12 supported by flexible brace members 20, thereby allowing a vehicle to enter and leave in any direction, the apparatus 10 may have only two opposing side walls 12 supported by brace members 20, with the remaining walls rigidly supported, such that a vehicle can be driven into and out of the apparatus 10 in a single direction, or the apparatus 10 may have only one side wall 12 supported by flexible brace members 20, such that the vehicle must be driven in and then backed out over the same side wall 12. The containment apparatus 10 may be a stand-alone device and completely self-supporting, or may be designed to be used in conjunction with fixed structures supporting one or more side walls 12, in which case the side walls 12 may be directly attached to the fixed structures. For example, a rectangular containment apparatus 10 having a single collapsible side wall 12 may be positioned within the bed of a trailer, such that the three non-collapsible walls 12 are connected to the interior walls of the trailer and the collapsible wall 12 is positioned at the open end of the trailer, allowing smaller vehicles such as fork lifts, mowers, or the like to be loaded or unloaded from the trailer, with the containment apparatus 10 capturing any liquid which may leak from the smaller vehicles. In like manner, pallets of barrels of hazardous liquid waste could be transported within the trailer, any leakage being captured by the containment apparatus 10, and fork lifts could be driven into and out of the trailer over the collapsible side wall 12 to load or unload the barrels.

It is understood that equivalents and substitutions to certain elements described above may be obvious to those skilled in the art, and representative examples are by way of illustration only. The true scope and definition of the invention therefore is to be as set forth in the following claims.

We claim:

1. A liquid containment apparatus comprising a liquid impermeable floor member and side walls combined to define an interior reservoir to receive and retain liquid, at least one of said side walls being supported by collapsible brace members, each of said brace members comprising a generally vertically disposed upper member joined to a generally horizontally disposed base member by a hinge member which maintains said upper member in said generally vertically disposed position in the passive state and which enables said upper member to bend outward and inward relative to said interior reservoir when sufficient force is applied, where said generally horizontally disposed base member comprises an interior end disposed inward of said at least one side wall and an exterior end disposed outward of said at least one side wall where said hinge members are positioned adjacent the junction between said at least one side wall and said floor member, and where each said hinge member comprises a resistance-type hinge having a minimum bending threshold which must be overcome to bend said hinge member.

2. The apparatus of claim 1, where said at least one side wall comprises retention means for said upper members.

3. The apparatus of claim 2, where said upper member retention means comprises a peripheral flap.

4. The apparatus of claim 2, where said upper member retention means comprises a pocket.

5. The apparatus of claim 1, where said apparatus further comprises a peripheral floor skirt member extending outwardly from said floor member, said floor skirt member comprising retention means for said base members.

6. The apparatus of claim 5, where said base member retention means comprises a pocket.

7. The apparatus of claim 5, where said base member retention means comprises slots.

8. The apparatus of claim 1, where adjacent said side walls are joined by a chamfered wall section.

9. The apparatus of claim 1, where said upper member is removable from said lower member.

10. The apparatus of claim 1, where said brace members are removable from said at least one side wall.

11. The apparatus of claim 1, where said side walls lean inward toward said interior reservoir.

12. The apparatus of claim 1, where said interior end of each of said brace members is beneath said floor member.

13. The apparatus of claim 1, where said upper member of each of said brace members is external to said at least one side wall.

14. The apparatus of claim 1, where each of said brace members is configured generally in the shape of an inverted "T".

* * * * *